(12) United States Patent
Castagna et al.

(10) Patent No.: US 8,977,088 B2
(45) Date of Patent: Mar. 10, 2015

(54) INTERPOSER WITH ALIGNMENT FEATURES

(75) Inventors: Lou Castagna, Middletown, PA (US); Richard Dean Miller, Lancaster, PA (US); William Lamar Herb, Harrisburg, PA (US); Donald Eugene Dellinger, Hellam, PA (US); Robert Nelson Fair, Jr., York, PA (US); Daniel Edward Gillis, Harrisburg, PA (US)

(73) Assignee: Tyco-Electronics Corporation, Berwyn, PA (US)

( * ) Notice: Subject to any disclaimer, the term of this patent is extended or adjusted under 35 U.S.C. 154(b) by 488 days.

(21) Appl. No.: 13/190,938

(22) Filed: Jul. 26, 2011

(65) Prior Publication Data

US 2012/0027346 A1 Feb. 2, 2012

Related U.S. Application Data

(63) Continuation-in-part of application No. 12/847,353, filed on Jul. 30, 2010.

(51) Int. Cl.
 *G02B 6/42* (2006.01)
 *G02B 6/26* (2006.01)
 (Continued)

(52) U.S. Cl.
 CPC ............ *G02B 6/4224* (2013.01); *G02B 6/4206* (2013.01); *G02B 6/3885* (2013.01); *G02B 6/4214* (2013.01); *G02B 6/4249* (2013.01); *G02B 6/4292* (2013.01)
 USPC .................................. 385/49; 385/52; 385/88

(58) Field of Classification Search
 USPC .................................................. 398/200, 214
 See application file for complete search history.

(56) References Cited

U.S. PATENT DOCUMENTS

| 4,904,036 A | 2/1990 | Blonder |
|---|---|---|
| 5,073,003 A | 12/1991 | Clark |

(Continued)

FOREIGN PATENT DOCUMENTS

| CN | 101014889 A | 8/2007 |
|---|---|---|
| EP | 1321784 A2 | 6/2003 |

(Continued)

OTHER PUBLICATIONS

International Search Report, International Application No. PCT/US2012/048224, International Filing Date Jul. 26, 2012.

(Continued)

*Primary Examiner* — Jerry Rahll

(57) ABSTRACT

An optical interposer for optically coupling light between an OED supported on a substrate and an optical fiber, the interposer comprising: (a) an interposer of an optically-clear moldable material comprising at least the following features: (b) a port for receiving a ferrule containing at least one optical fiber, the port comprising an interface surface positioned to optically couple with an end face of the optical fiber; (c) an active lens adapted to optically couple with an OED, the active lens and the interface surface optically coupled along an optical path in the interposer; (d) a protrusion extending backward from the port, the protrusion defining a first register surface, the first register surface being a certain distance from the optical path such that, when a second register surface of a ferrule containing the optical fiber contacts the first register surface, the ferrule is aligned with the port such that the port can receive a front portion of the ferrule if the ferrule is pushed forward.

22 Claims, 8 Drawing Sheets

(51) Int. Cl.
*G02B 6/30* (2006.01)
*G02B 6/38* (2006.01)

(56) References Cited

U.S. PATENT DOCUMENTS

| | | | |
|---|---|---|---|
| 5,515,468 A | 5/1996 | DeAndrea et al. |
| 5,548,677 A | 8/1996 | Kakii et al. |
| 5,708,743 A | 1/1998 | DeAndrea et al. |
| 7,399,125 B1 | 7/2008 | Whaley et al. |
| 2004/0234210 A1 | 11/2004 | Nagasaka et al. |

FOREIGN PATENT DOCUMENTS

| | | |
|---|---|---|
| JP | 2004-240220 | 8/2004 |
| KR | 1020080086831 A | 9/2008 |

OTHER PUBLICATIONS

English translation of Office Action, dated May 5, 2014, issued in related Chinese Application No. 201180037631.5.

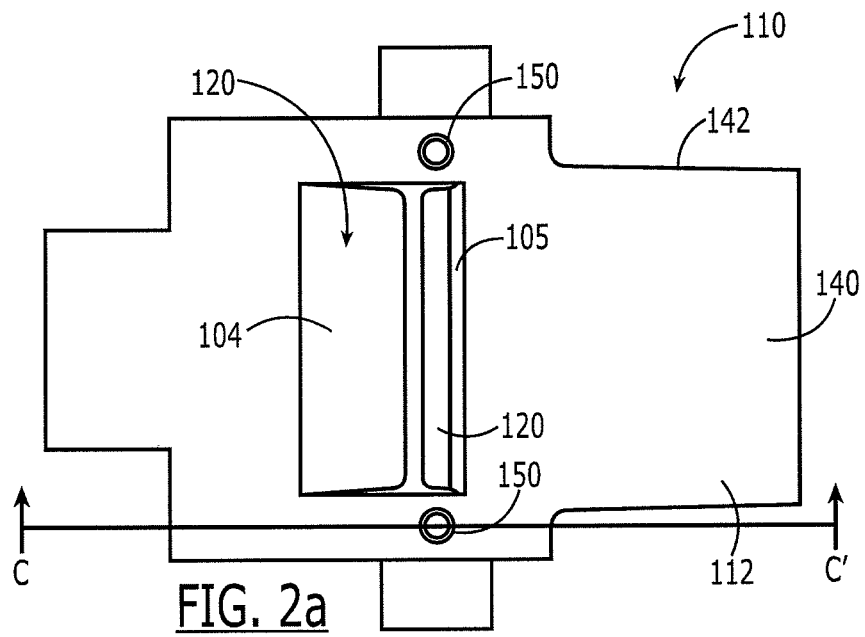
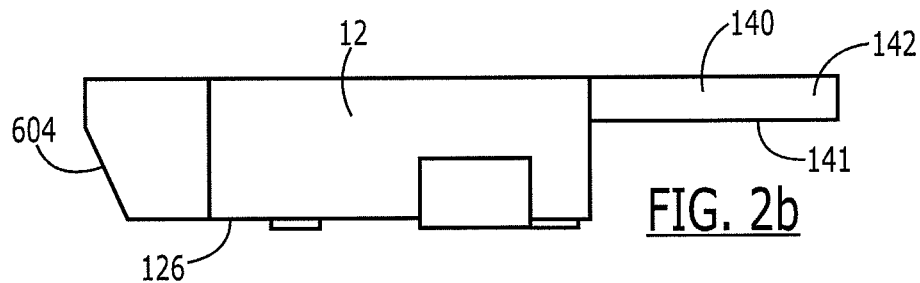
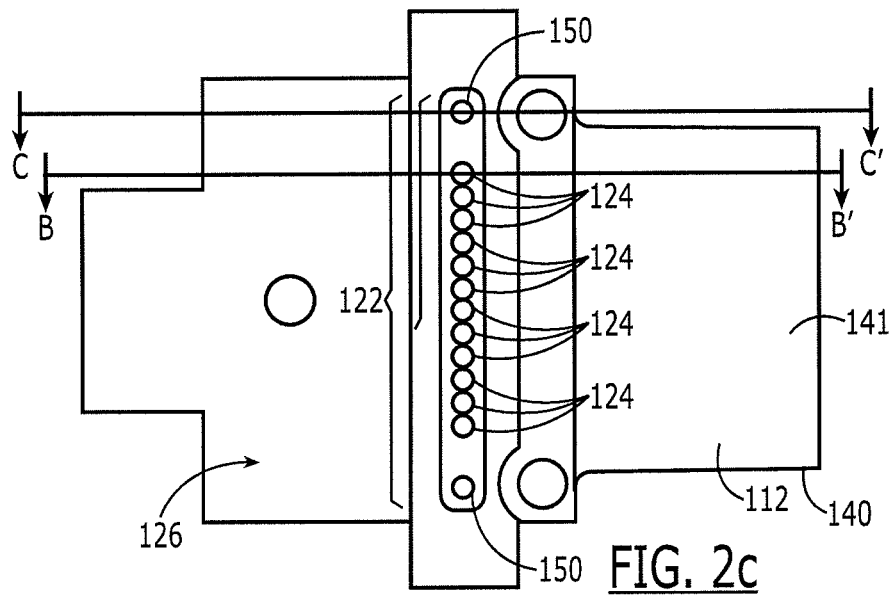

INTERPOSER WITH ALIGNMENT FEATURES

REFERENCE TO RELATED APPLICATION

This application is a continuation-in-part of U.S. application Ser. No. 12/847,353, filed Jul. 30, 2010, and claims priority thereto and is hereby incorporated by reference.

FIELD OF INVENTION

The present invention relates generally to alignment of articles into an operative position, such as alignment of coupling devices for optically coupling a fiber optic cable and an opto-electronic device, and more particularly to an interposer having one or more alignment features for aligning optical fibers with opto-electronic devices on the substrate.

BACKGROUND

Typical fiber optic connectors require a coupling device which effectively optically couples the fiber optic transmission line with an opto-electronic device (OED). The OED is further electronically coupled to electronic circuits which operate in conjunction with the OED. Often, such electronic circuits, including integrated circuits, are mounted on a printed circuit board or ceramic substrate. These circuit boards/substrates are then densely packed into panels.

To accommodate the use of optical transmission devices in densely packed parallel arrangements of circuit boards, it is commonly required that the fiber optic cable enter the printed circuit board along a path substantially parallel to the board with which it will interface. Complicating this requirement is the fact that commonly-used OEDs have an optical axis that is perpendicular to the substrate. Specifically, a prevalent technology in the optical communications industry is surface emitting and detecting devices. Devices such as vertical cavity surface emitting lasers (VCSELs), surface emitting light emitting diodes as well as most PIN detectors have a photosensitive surface to receive or emit light from or to the top or bottom surface. Because these devices have a vertical optical axis and the fibers are generally parallel to the substrate, an interposer is needed to bend the light between the OEDs and the optical fibers. Some success has been achieved in coupling surface emitting and detecting devices through a 90 degree molded optic coupler as is disclosed in U.S. Pat. Nos. 5,515,468 and 5,708,743 to DeAndrea, et al., the entire disclosures of both of which are hereby incorporated herein by reference. Further examples of such techniques are found in U.S. Pat. Nos. 5,073,003 and 4,904,036 to Clark and Blonder respectively, the disclosures of both of which are hereby incorporated herein by reference.

A more recent interposer, such as those used in active cable assemblies, is shown in FIGS. 1a-f. As shown, the interposer 10 includes a lens body 12 having a ferrule-receiving port 14 for receiving a ferrule such that the end face of the fibers in the ferrule abut an interface surface 16 in the lens body. An array 22 of lenses 24 is disposed along the bottom 26 of the lens body 12. Each lens 24 corresponds to a particular fiber. A reflective surface 20 bends the light traveling between the fibers and the lens 24. Thus, the interposer 10 provides optical paths adapted for optically coupling an OED supported on a substrate with a corresponding fiber supported in the port 14 of the interposer 10. As will be appreciated by those of ordinary skill in the art, such an interposer 10 is suitable for inclusion in various cable assemblies and transceivers, which may be mounted in a variety of host systems including for example, routers, computers, switches, bridges, and I/O cards.

The alignment of the interposer to the substrate, or more particularly, the alignment of the lenses, optical paths and fibers to the OEDs on the substrate, is critical for proper optical coupling between the OEDs and the fibers. Different alignment techniques are used to achieve this alignment. Active alignment techniques are sometimes used to align the interposer relative to a substrate supporting OEDs (such as VCSELs or other light sources) emitting or receiving light substantially perpendicularly to a plane of the substrate. In active alignment, the light sources are activated and emit light. A problem with active alignment is that the process requires special imaging equipment and can be expensive, particularly with respect to light bending optical couplings.

Various passive alignment techniques may also be used. In one passive alignment technique, an image of the light source itself (e.g., a portion of a VCSEL) may be viewed with the human eye through the reflective surface and lenses, thus eliminating the need for special imaging equipment. However, this method requires additional hardware and fixturing to properly view the alignment features, due to tight spacing constraints in the OED assembly. Additionally, this technique is unsafe in that any accidental activation of the light sources will cause damage to the human eye used during the alignment process. That is, since the optical paths for alignment and communication purposes are identical or parallel and/or the alignment feature is the light source itself (e.g., a VCSEL), and thus the eye is in position to be damaged during visual alignment. In yet another passive alignment technique, alignment features are provided on the substrate in the same place as the OEDs. However, in such an arrangement, the alignment structures of the interposer are in a different plane, parallel to and removed from the plane of the OEDs. These alignment features are then viewed through a path external to the reflective surface to eliminate the tight spacing constraints. Although this approach tends to be relatively safe, this method tends to be inaccurate because of the depths of field difference between the two planes exceeds the capability of typical imaging systems. Therefore, in order to achieve alignment, a fixed external reference point must be introduced to which alignment features must be aligned individually. The end result is that the alignment features and alignment structures would be aligned to each other, but the additional step of having to align each to an external reference point introduces additional inaccuracies.

In addition to aligning the lens with the OEDs on the substrate, there is a need to align the fibers with the optical paths in the interposer. One approach is to mount the fibers in a ferrule and then have the ferrule received in the port of the interposer (as described with respect to FIG. 1). Although this approach provides a convenient mechanism and a modular approach for coupling the fibers to the interposer, significant challenges are faced in aligning the ferrule relative to the lens body to enable the port to receive the ferrule, and then holding the ferrule in the port such that the fibers are aligned with the optical paths.

Therefore, Applicants have identified a need for an interposer for coupling an optical fiber to an OED that allows for safe viewing and accurate alignment of any light sources, without the need for special hardware and/or fixturing, using a passive alignment technique. Applicants have also identified a need to align the ferrule with the lens body to enable the port to receive the ferrule and then hold the ferrule in the port precisely such that the fibers are aligned with the optical paths in the lens body reliably and conveniently. The present invention fulfills one or more of these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An interposer in accordance with one aspect of the present invention includes a lens body of an optically-clear moldable material. The lens body includes a port for receiving a ferrule supporting at least one optical fiber. The port includes an interface surface positioned to abut and interface with the optical fiber when the ferrule is positioned in the port. The lens body further includes at least one active lens adapted to cooperate optically with a respective OED to focus light along a respective optical path between the OED and a corresponding optical fiber. The interposer also includes at least one alignment structure defining a viewing surface, and at least one dedicated lens adapted to focus an image of an alignment feature on the substrate onto the viewing surface. The dedicated lens is positioned externally to any optical path between a light source and corresponding optical fiber.

Another aspect of the present invention provides an optical subassembly including a substrate supporting an OED/light source having an optical axis, the substrate further comprising at least one perceptible alignment feature provided in a predetermined spatial relationship to the OED/light source, and an interposer secured to the substrate.

The substrate's alignment feature(s) is/are provided in a predetermined spatial relationship relative to the OEDs on the substrate. This predetermined spatial relationship corresponds to a spatial relationship between the viewing surfaces and the dedicated lenses of the interposer. In this manner, alignment of the substrate's alignment features with the interposer's viewing surfaces ensures proper alignment of the substrate's OEDs with the interposer's active lenses, light paths, and any connected fibers.

Optionally, the interposer includes multiple active lenses and/or multiple dedicated lenses and multiple alignment features. Further, the interposer may also include at least one reflective surface disposed along one or more optical paths to alter the direction of the optical paths between each OED and its corresponding optical fiber.

Another aspect of the present invention provides a method for preparing an optical subassembly. The method includes providing a substrate supporting a light source having optical axis, the substrate further comprising at least one alignment feature provided in a predetermined spatial relationship to the light source, providing an interposer having an alignment structure having a viewing surface, positioning the interposer on the substrate so that the substrate's alignment feature is viewable on the interposer's viewing surface, moving the interposer relative to the substrate until the image of the substrate's alignment feature appears aligned relative to the viewing surface, and securing the lens body to the substrate. In this manner, an optical subassembly is provided in which the substrate's OEDs are properly aligned with the interposer's active lenses, light paths, and any connected fibers.

Yet another aspect of the present invention involves alignment of articles more generally, including articles unrelated to fiber optic communications. In accordance with this aspect, the present invention provides a lens body configured for alignment to a substrate comprising at least one perceptible alignment feature. The lens body includes at least one alignment structure defining a viewing surface; and a dedicated lens adapted to focus an image of the substrate's alignment feature through an optically-clear material of the lens body and onto the viewing surface. An assembly may includes the lens body and the substrate comprising at least one perceptible alignment feature, such that the lens body is secured to the substrate with the substrate's alignment feature aligned relative to, e.g., centered within a boundary of, the viewing surface of the lens body's alignment structure.

Still another aspect of the invention is an interposer having a primary alignment means for aligning the ferrule and the lens body to enable the port to receive the ferrule. This aspect of the invention is particularly effective if coupled with secondary alignment means which control the precise positioning of the ferrule in the port to ensure that the fiber(s) in the ferrule is (are) precisely aligned with the optical paths of the lens body. In one embodiment, the interposer comprises an optically-clear moldable material comprising at least the following features: (a) a port for receiving a ferrule containing at least one optical fiber, the port comprising an interface surface positioned to optically couple with an end face of the optical fiber; (b) an active lens adapted to optically couple with an OED, the active lens and the interface surface optically coupled along an optical path in the interposer; and (c) a protrusion adjacent the port and extending backward from the interface surface, the protrusion defining a first register surface, the first register surface being a certain distance from the optical path such that, when a second register surface of a ferrule containing the optical fiber contacts the first register surface, the ferrule is aligned with the port such that the port can receive a front portion of the ferrule if the ferrule is pushed forward.

BRIEF SUMMARY OF DRAWINGS

The present invention will now be described by way of example with reference to the following drawings in which:

FIG. 1e is a cross-sectional view of the interposer of FIGS. 1a-1d, taken along line A-A' of FIG. 1a;

FIGS. 2a, 2b, 2c and 2d are top, side, bottom and rear views, respectively, of an exemplary interposer including alignment structures and dedicated alignment lenses in accordance with the present invention;

FIG. 2e is a cross-sectional view of the interposer of FIGS. 2a-2d, taken along line B-B' of FIG. 2a;

FIG. 8b shows a front view of the ferrule shown in FIG. 8a.

FIG. 8c shows a side view of the ferrule shown in FIG. 8a.

DETAILED DESCRIPTION

Figure 1A:
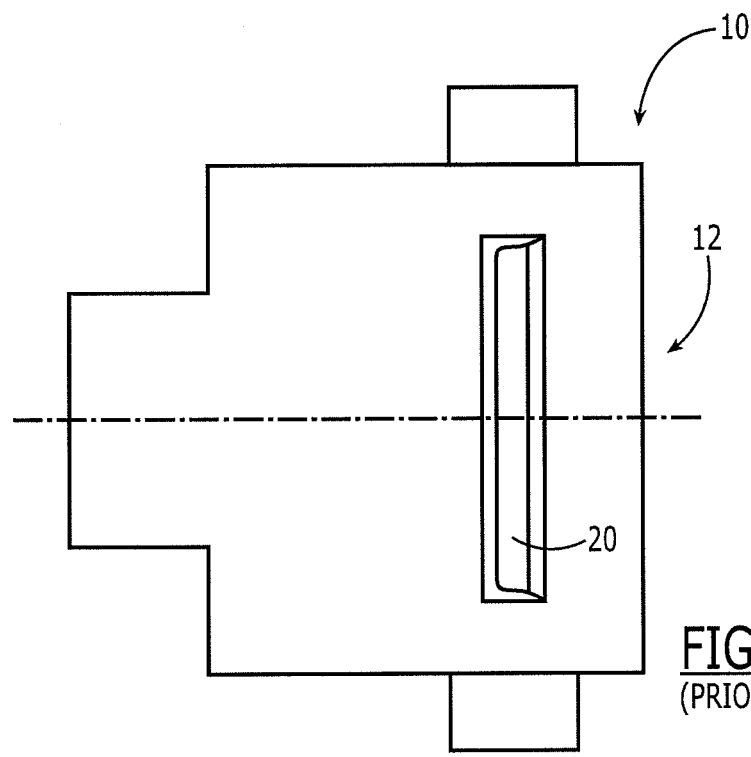
FIGS. 1a, 1b, 1c and 1d are top, side, bottom and rear views, respectively, of an exemplary prior art interposer including lenses and a reflective surface for bending light travelling between OEDs mounted on a substrate and optical fibers substantially parallel to a plane of the substrate.
Figure 1B:
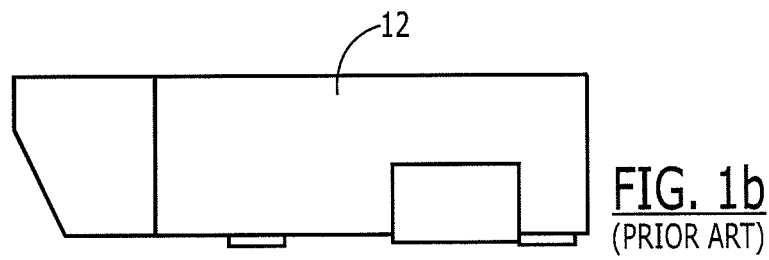
Figure 1C:
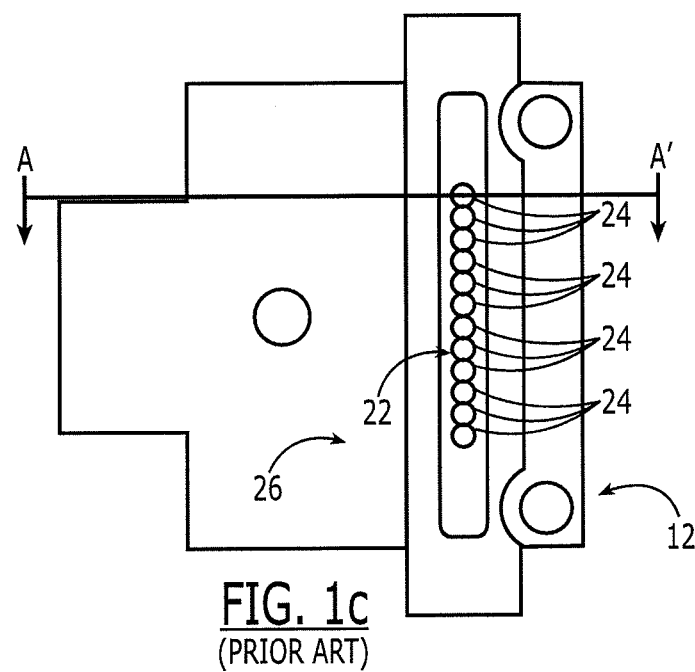
Figure 1D:
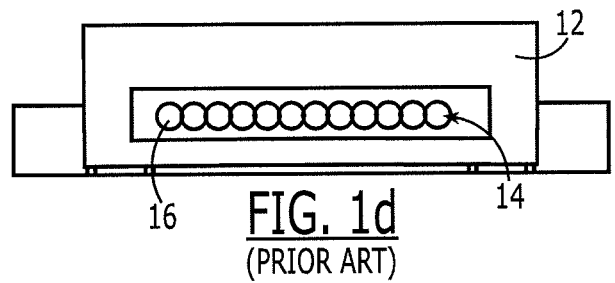
Figure 1E:
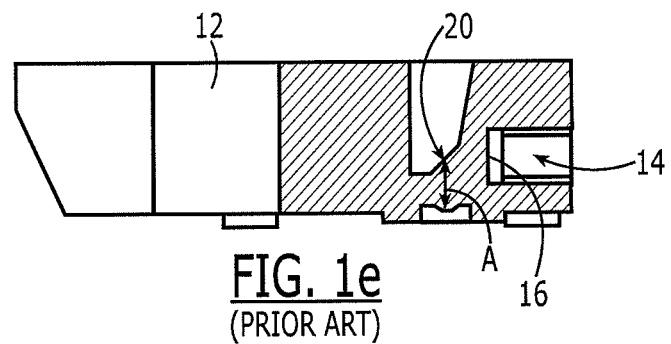
Figure 1F:
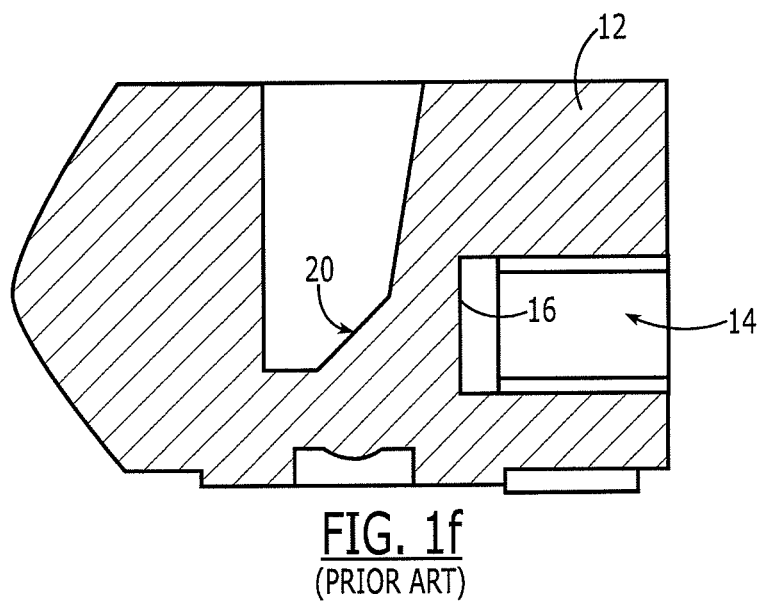
FIG. 1f is a partial cross-sectional view of the interposer of FIGS. 1a-1d, showing an enlarged view of Region 1 of FIG. 1e.
Figure 2D:
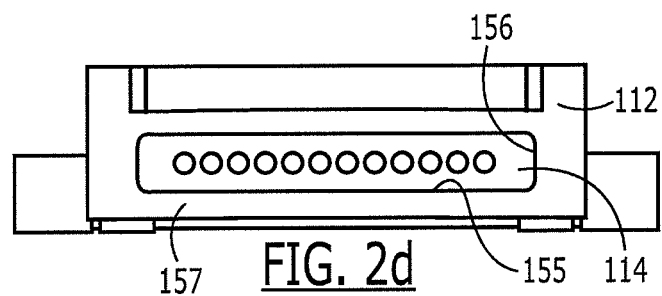
Figure 2E:
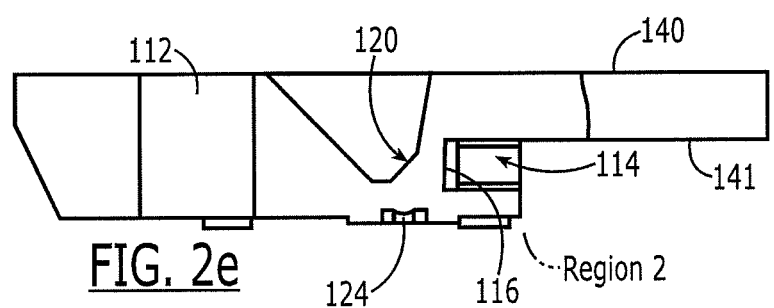
Figure 2F:
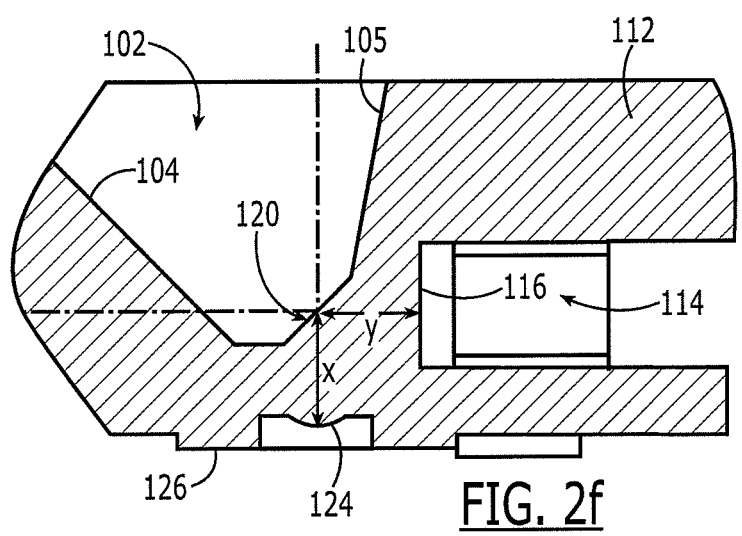
FIG. 2f is a partial cross-sectional view of the interposer of FIGS. 2a-2d showing an enlarged view of Region 2 of FIG. 2e.

For illustrative purposes, the present invention is discussed below in the context of an interposer for optically coupling light between an OED supported on a substrate and an optical fiber. Referring to FIGS. 2a-2g and FIGS. 8a-8c, one embodiment of an interposer 110 of the present invention is shown comprising a lens body 112 of optically-clear moldable material comprising a port 114 for receiving a ferrule 800 (see FIG. 8a), which contains at least one optical fiber (not shown). The port 114 comprises an interface surface 116 positioned to optically couple with an end face of the optical fiber when the ferrule is disposed in the port 114. Typically, the optical fiber will abut the interface surface. As used here, "abut" or "abutting" means in or near physical contact, e.g., separated by a gap of no more than approximately 0.025 mm. The lens body 112 has a bottom surface 126 for abutting a substrate supporting one or more OEDs (not shown), and at least one active lens 124, each lens corresponding to an OED for focusing light to and from the OEDs. Generally, although not necessarily, the lens body 112 comprises a plurality of active lenses 124 (twelve shown) arranged in a linear array 122, as shown in FIG. 2c. Each active lens 124 and the interface surface are optically coupled along an optical path in the lens body 112. In one embodiment, a protrusion 140 extends backward from adjacent the port 114. The protrusion 140 defines a first register surface 141, which is a certain distance from the interface surface 116 such that, when a second register surface 803 of the ferrule 800 contacts the first register surface 141, the optical fiber is aligned substantially with the optical path. These elements and alternative embodiments are discussed in greater detail below.

Throughout this description, the interposer and its components are described with respect to a top/bottom and front/back orientation. It should be understood that reference is made to this orientation for purposes of illustration and to describe the relative position of the components within a given interposer. It should therefore be understood that this orientation is not an absolute orientation and that rotating, inverting or otherwise altering the interposer's position in space is possible without changing the relative position of the components of the connector.

In one embodiment, the interposer 110 of FIGS. 2a-2g comprises a unitary body structure of an optically-clear moldable material. The term "optically-clear moldable material" as used herein means characterized by low losses in the transmission of an optical signal. For example, the interposer may be uniformly formed by molding fluent plastic material into a precisely-defined shape and configuration such that all of the optical path elements are set, e.g. by injection molding, compression molding or transfer molding a polycarbonate, polyether-imide or polyethersulfone material, such as those commercially available Sabic as ULTEM™ or RADEL™.

As the term is used herein, "opto-electronic device" or OED refers to a device that converts electrical current to light and/or light to electrical current. The term "light" refers generally to electromagnetic radiation, and preferably to those wavelengths of electromagnetic radiation to which semi-conductive material is, or can be made, sensitive, whether or not such light is actually visible to the unaided eye. Examples of OEDs include lasers (e.g., vertical cavity surface emitting laser (VCSEL), double channel, planar buried heterostructure (DC-PBH), buried crescent (BC), distributed feedback (DFB), distributed bragg reflector (DBR), etc.), light emitting diodes (LEDs) (e.g. surface emitting LED (SLED), edge emitting LED (ELED), super luminescent diode (SLD), etc.) and photodiodes (e.g., P Intrinsic N (PIN), avalanche photodiode (APD), etc.) By way of further example, an OED, as used herein, may be a light sources such as an optical fibers, such as a multi-mode (mm) or single-mode (sm) fibers, glass fibers, plastic fibers, etc. The OEDs are mounted to the surface of a substrate. As the term is used herein, "substrate" may refer to virtually any component or article. However, in the context of fiber optic communications, the term "substrate" as used herein refers to an electronic component having electronic circuit elements mounted thereto or forming part thereof. The substrate may include, for example, a plurality of integrated chips. Such chips may represent, for example, a pre-amplifier or post-amplifier and additional electronic circuits. The type and nature of such circuit elements, and the techniques and methods for mounting such elements to the substrate are well known in the art and do not form part of the present invention. In typical embodiments, the substrate comprises a printed circuit board (PCB), a printed wiring board (PWB), a flexible printed circuit (FPC), a circuitry-bearing glass wafer, and/or similar substrates well known in the art.

As mentioned above, one aspect of the present invention is to provide alignment means for ensuring a high performance optical coupling between the OEDs and the optical fiber. To this end, in one embodiment, the interposer of the present invention has primary alignment means for aligning the ferrule with the lens body 112 to enable the port 114 to receive a front portion 830 of the ferrule 800. Specifically, the lens body 112 has the protrusion 140 for aligning the ferrule 800 containing optical fibers with the optical paths defined in the lens body 112. Specifically, the protrusion 140, which is adjacent the port 114, extends rearward and defines the first register surface 141 that functions to register the ferrule in proper position with respect to the port 114 defined in the lens body 112. In this embodiment, a first register surface 141 is defined on the downward-facing surface of protrusion 140, although as discussed below, it can be defined in any position.

Referring to FIGS. 8a through 8d, one embodiment of the ferrule 800 is shown. The ferrule 800 comprises a body portion 801 through which are defined one or more channels 806 for receiving one or more optical fibers (not shown). The end of each fiber is disposed in a bore hole 804 such that the end face of the fiber is essentially flush with (or slightly protruding form) the end face 802 of the ferrule 800. As mentioned above, the primary alignment means function to align the front portion 830 of the ferrule sufficiently with the lens body such that the front portion can be received in the port 114. In this embodiment, the primary alignment means comprises a second register surface 803 on the ferrule. In this particular embodiment, the register surface 803 is upward facing and is configured to cooperate with the first register surface 141, such that, when the ferrule 800 is received in port 114, the first register surface 141 contacts the second register surface 803. Because the first and second register surfaces are essentially horizontal relative to the substrate, when they contact, the ferrule is substantially aligned vertically with the lens body. The term "substantially aligned" in this context means that the front portion 830 is positioned precisely enough that it can be received in the port 114. In other words, the front face 802 of the ferrule does interfere with the perimeter 157 around the port. Once the front portion 830 of the ferrule is received in the port, secondary, more precise, alignment means may be used to precisely align the bore holes 804 with respect to the interface surface 116 (described below).

Although the first surface was shown as a downward-facing surface and the second surface on a ferrule was shown as an upward-facing surface, it should be appreciated that the orientations may be reversed and that a protrusion below the port 114 may be used to define an upward-facing first register surface. Still other embodiments will be obvious to one of skill and the art in light of this disclosure.

Figure 8A:
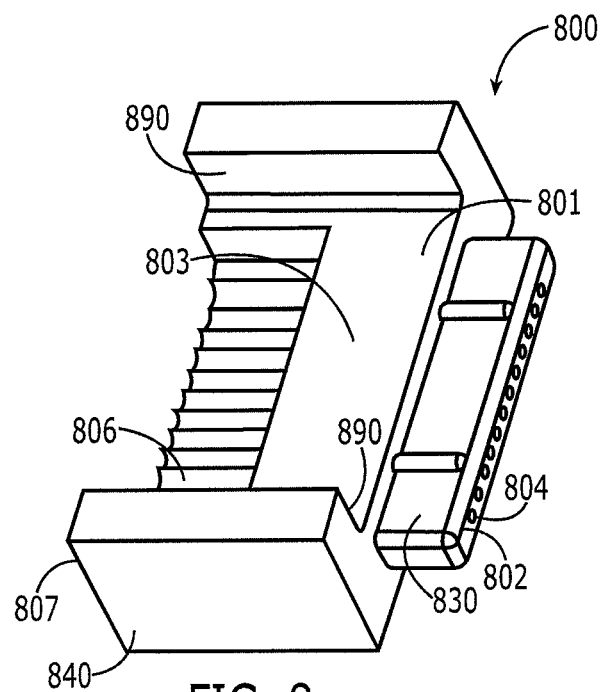
FIG. 8a shows a perspective view of one embodiment of the ferrule of the present invention.
Figure 8B:
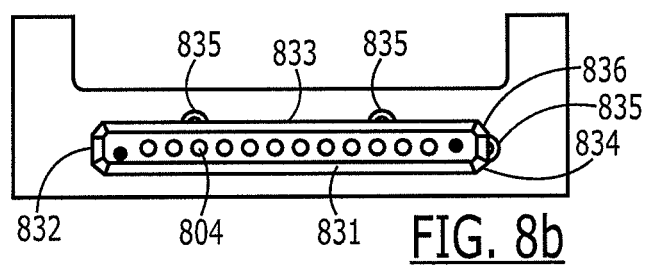
Figure 8C:
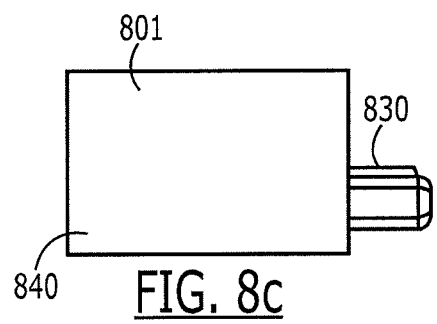

As an alternative or in addition to the horizontal register surfaces, the primary alignment means may also comprise vertical register surfaces to align the ferrule horizontally with respect to the lens body. For example, referring to FIG. 2a, in addition to having the first register surface 141 as described above, the protrusion 140 may also have third register surfaces 142 along its sides. In this embodiment, the third register surfaces 142 along the sides of the protrusion 140 are tapered such that the distance between them widens as they approach the port 114. Cooperating with the third register surfaces 142 are the fourth register surfaces 804 on vertical protrusions 807 on the ferrule 800 as shown in FIG. 8c. The protrusion 140 of the lens body is configured to fit between the vertical protrusions 807 of the ferrule, such that, as the ferrule is pushed forward relative to the lens body, the tapered third register surfaces 142 contact the fourth register surfaces 804, and substantially align the ferrule horizontally with respect to the lens body. In other words, as the ferrule is moved forward relative to the lens body, the tapered protrusion is essentially wedged between the vertical protrusions to center the ferrule relative to the lens body. Again, the term "substantially align" in this context refers to positioning the front portion 830 sufficiently such that it can be received in the port 114. As mentioned above, secondary alignment means are used to finally align the bore holes 804 with the interface surface 116.

Therefore, the first and third register surfaces 141, 142 of the lens body 112 and the second and fourth register surfaces 801, 804 of the ferrule cooperate, respectively, to substantially align the front portion 830 of the ferrule vertically and horizontally with the port 114 such that the front portion can be received in the port and thereby facilitate more precise alignment with the secondary alignment means (described below)

Once the front portion of the ferrule is inside the port, secondary means of aligning the ferrule control to precisely align the bore holes to the interface surface. Different embodiments of the secondary means are possible. Suitable secondary means include, for example, alignment pins/guide holes (such as used in MT-type ferrules), register surfaces on the front portion and port, crush ribs, tongue and groove arrangment and combinations of these means. For example, referring to FIGS. 8a-c, an embodiment in which register surfaces in combination with crush ribs are used. Specifically, one horizontal surface and one vertical surface of the front portion 830 are register surfaces. In this particular embodiment, the bottom surface 831 and a side surface 832 are the fifth and sixth register surfaces, respectively. Conversely, the top surface 833 and opposing side surface 834 are not register surfaces but rather have crush ribs 835, 836 respectively protruding from them.

Referring back to FIG. 2d, the port 114 has one horizontal surface and one vertical surface along its perimeter 157 that function as register surfaces. In this particular embodiment, the bottom surface 155 and a side surface 156 are the seventh and eighth register surfaces, respectively.

As the front portion 830 is pushed into the port 114, the resiliency of the crush ribs 835, 836 push the front portion 830 downward and to the right (looking forward) such that the fifth and seventh register surfaces contact to align the front portion vertically, and the sixth and eighth register surface contact to align the front portion horizontally, thereby ensuring that the bore holes 804 are aligned with the optical paths in the interface surface 116 to optically couple the fibers in the bore holes 804 with the lenses 124. Thus, in the embodiment of FIGS. 1 and 8, the primary alignment means are used to align the front portion with the port, and the secondary alignment means are used to align the bore holes with the interface surface.

Figure 6:
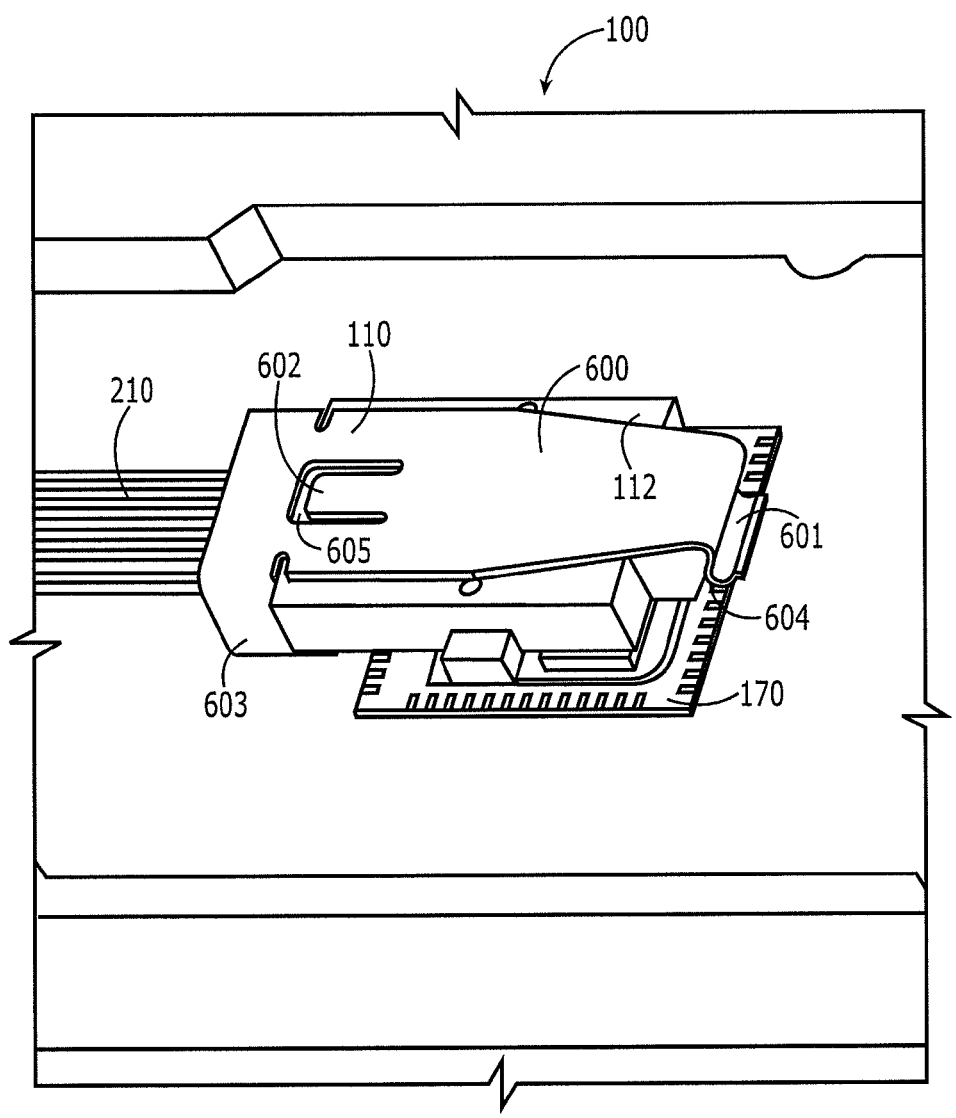
FIG. 6 is a perspective view of the interposer of FIGS. 2a-2g, shown mounted to an exemplary substrate in an optical subassembly.

In one embodiment, to ensure contact between the various register surfaces, a clip is used. One embodiment of the clip is shown in FIG. 6. In this particular embodiment, the clip 600 comprises a forward resilient tab 601, a top resilient tab 602 and at least one rear tab 603. The lens body comprises a recess 604 for receiving the forward tab 601 and it has an upper portion 605 against which the upper top tab 602 urges against. Likewise, the ferrule comprises corner portions 840 which are received in the tabs 603. In this configuration, the resilient forward tab 604 or 601 urges the clip 600 forward while the resilient top tab 602 urges the clip upward such that the ferrule held by tab 603 is urged upward and forward such that the respective register surfaces contact each other, thereby aligning the ferrule horizontally and vertically in the port 114 as described above.

Although this clip configuration provides an economic and easily-used means of ensuring the register surfaces contact each other when the interposer is assembled, other embodiments are possible. For example, rather than the top tab 602 to urge the clip upward relative to the lens body, resilient tabs may extend downward from the clip so as to urge the clip upward from the substrate. Again, still other embodiments in light of this disclosure will be obvious to those of skill in the art.

Unlike prior art lens bodies, an interposer 110 in accordance with the present invention further includes at least one alignment structure 440 defining a viewing surface 442 (see FIGS. 2a, 2g), and at least one dedicated lens 150 (see FIGS. 2c, 2g) positioned externally to any optical path that passes through the interposer 110 between optical components. Preferably, the interposer includes at least a pair of dedicated lenses 150. Optionally, the pair of dedicated lenses 150 are arranged in the same single linear array along with the active lenses 124, as best shown in FIG. 2c. In such an embodiment, all of plurality of active lenses 124 may be positioned between the pair of dedicated lenses 150 within the linear array, as shown in FIG. 2c. Such positioning of the dedicated lenses relative to the active lenses can facilitate proper alignment.

Figure 2G:
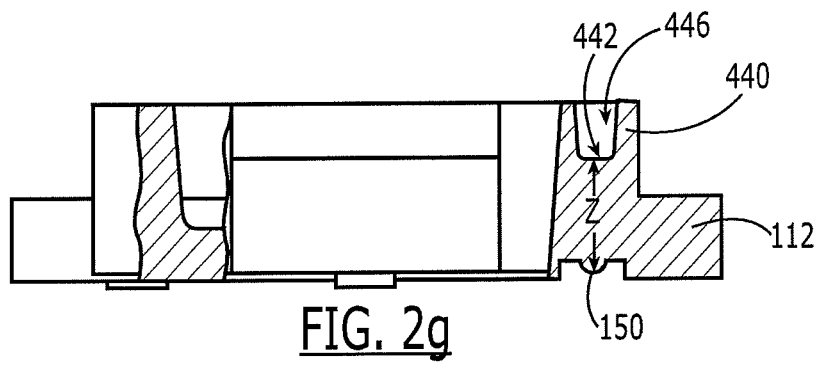
FIG. 2g is a cross-sectional view of the interposer of FIGS. 2a-2d, taken along line C-C' of FIGS. 2a and 2c.
Figure 4:
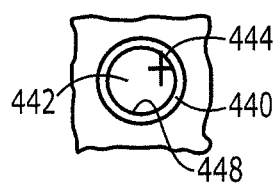
FIG. 4 is a partial top view of the interposer of FIGS. 2a-2g, showing a plan view of an exemplary substrate alignment feature as viewed in misalignment with an alignment structure of the interposer.

In one embodiment, the alignment structure 440 defines a void 446 in the lens body 112 adjacent a substantially-planar viewing surface 442, as best shown in FIG. 2g. By way of example, the void may be formed by a core pin during injection molding of the lens body to provide a highly polished viewing surface 442 to facilitate viewing of an image projected thereon. In the exemplary embodiment shown in FIGS. 2a-2g, the alignment structure 440 is formed so that the void 446 has an inverted truncated conical shape. Though any suitable structure may be used, this shape has advantages with respect to molding of the lens body 112, and has further advantages in that it provides a viewing surface 442 that has a circular peripheral boundary 448, as best shown in FIG. 4. Such a boundary may be advantageous to a human when discerning when the image 444 of the alignment structure 174 is centered/aligned with the viewing surface 442, as discussed below. However, any suitable shape and configuration for the alignment structure and/or the viewing surface/boundary may be used.

Further, the substrate 170 is specially-configured in accordance with the present invention to include at least one perceptible alignment feature 174. By way of example, the substrate's alignment feature may be configured to appear as a circle, a plus sign, an X, or any other perceptible image printed or otherwise provided on the surface of the substrate 170. By way of example, the alignment feature may be provided on the substrate 170 as a thin film of metal provided by a precision chemical etching process. In one embodiment, the alignment feature 174 be substantially flat, and lie in substantially the same plane as a light-emitting surface of the light source. This allows the dedicated alignment lens(es) to be of identical shape to the active lens(es), and to be made using the same tool/process, thereby eliminating mold fabrication tooling change-over which can introduce error in the location of the dedicated lens(es) relative to the active lens(es). In one embodiment, a single alignment feature of this type is provided, which may cooperate with another form of alignment feature, e.g., a mechanical pin-and-socket arrangement. In one embodiment, at least a pair of such alignment features are provided on the substrate.

The substrate's alignment feature(s) is/are provided in a predetermined spatial relationship relative to the OEDs on the substrate 170. This predetermined spatial relationship corresponds to a spatial relationship between the viewing surfaces 442 and the dedicated lenses 150 of the interposer 110. In this manner, alignment of the substrate's alignment features 174 with the interposer's viewing surfaces 442 will ensure proper alignment of the OEDs 180 with the interposer's active lenses 124, light paths, and any connected fibers. Each dedicated lens 150 is adapted to focus an image 444 (see FIGS. 4 and 5) of the substrate's alignment feature 174 (see FIG. 3) onto a viewing surface 442 for the purpose of properly aligning the interposer 110 with the substrate 170 (see FIG. 3), or more particularly, alignment of the active lenses 124, light paths and fibers to the OEDs 180 on the substrate 170, for proper optical coupling between the OEDs and the fibers.

In one embodiment, the active lenses 124 and the dedicated lenses 150 are configured to have substantially identical optical prescriptions, such that they having a substantially identical focal length. In such an embodiment, each viewing surface 442 is positioned on the interposer 110 such that the optical path length between the active lens 124 and the interface surface 116 (X+Y, FIG. 2f) is substantially identical to the optical path length (Z, FIG. 2g) between the dedicated lens 150 and the viewing surface 124. In this embodiment, both the viewing surface 124 and the image 444 of the substrate's alignment feature 174 lie in the same (or very nearly the same) plane, and thus are both easily and clearly perceivable by the human eye or conventional imaging systems as both will appear clearly with the same depth of field from a point of observation. This eliminates the need to focus on and align different alignment features lying in different planes at different depths of field, and facilitates accurate alignment, even with nothing more than the human eye.

In an alternative embodiment, the dedicated lens has a prescription/focal length different from that of an active lens. In such an embodiment, the optical path length between the active lens and the interface surface would preferably not be substantially identical to the optical path length between the dedicated lens and the viewing surface. Instead, the path length between the dedicated lens and the viewing surface is substantially identical to the focal length of the dedicated lens.

In one embodiment, the interposer comprises a reflective surface 120 as shown in FIGS. 2a-2g, disposed along one or more optical paths between the OED 180/active lens 124 and the interface surface 116/fibers. The reflective surface 120 bends the light such that the optical axes of the OEDs and the fibers need not be coincident. In one embodiment, the reflective surface 120 is at about 45° to the substrate such that the light between the optical fibers and OEDs is bent about 90°. Such light bending in known in the art.

Although different reflective surfaces may be used, in one embodiment, a total internal reflection (TIR) prism is used, which are known in the art. Such a TIR may be formed in the lens body 112 by defining a cavity 102 in the lens body, with a portion of the cavity 102 being defined by the reflective surface 120. Again, this is known in the art. However, one aspect of the present invention is being able to inspect the lens body and in particular the reflective surface. To this end, applicants have discovered that having a reflective surface defined by narrow cavity tends to be problematic as inspection of the reflective surface is significantly impeded by the narrow opening. Accordingly, in one embodiment, the cavity is broadened to give better access to the reflective surface. For example, referring to FIG. 2f, one embodiment of the lens body of the present invention is shown. As shown, a cavity 102 defines the reflective surface 120 which is the interface between the air of the cavity and the plastic of the body. Also shown is a front wall 104, which is angled about 55° to about 110° from the reflective surface 120. The back wall 105 is angled about 135° to 180° from the reflective surface 120. The side walls 106 are essentially perpendicular to the reflective surface 120 although they may also be angled slightly outward to facilitate access to the reflective surface 120. In the particular embodiment shown in FIG. 2f, the forward wall 104 is about 90° relative to the reflective surface 120 and the rear wall is about 145° relative to the reflective surface and the side walls are about 95° or so, relative to the reflective surface. Such a configuration has been shown to provide adequate access to the reflective surface.

An optical path between each of the dedicated lenses 150 and each respective viewing surface 442 is preferably linear. Thus, in such an embodiment, the optical path between the viewing surface 442 and the dedicated lens 150 does not pass through the reflective surface 120. Further, the optical path between the viewing surface 442 and the dedicated lens 150 is preferably parallel to an optical path between the active lens 124 and the reflective surface 120 and/or perpendicular to an optical path between the reflective surface 120 and the interface surface 116 and/or the optical axis of any fibers positioned in a ferrule in the port 114.

The interposer 110 of FIGS. 2a-2g may be used to prepare an optical subassembly including the interposer. A method of preparing such an optical subassembly includes providing a substrate 170 (FIG. 3) supporting an OED 180, such as a light source. Such a substrate may be substantially conventional in nature, such as a thin glass wafer with conductive circuitry, and thus techniques for providing same are not discussed here in further detail. However, this step further includes providing a substrate that includes at least one perceptible alignment feature 174 (FIG. 3) provided in a predetermined spatial relationship to the light source. Preferably, substrate comprises at least a pair of alignment features, and each of the alignment features is visually perceptible with the unaided human eye. Techniques for providing an alignment feature, such as a circle, + or X include a precision chemical etching process. Alternatively, the alignment feature is perceptible, but not visually perceptible with the unaided eye. For example, such an alignment feature may include an infrared target, such as a suitable VCSEL or other light source, and suitable imaging equipment is used to perceive the alignment feature for alignment purposes.

Figure 5:
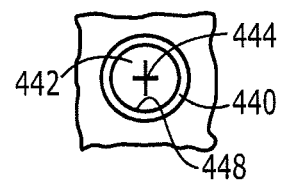
FIG. 5 is a partial top view of the interposer of FIGS. 2a-2g, showing a plan view of an exemplary substrate alignment feature as viewed in alignment with an alignment structure of the interposer.

The method further includes providing the interposer 110, and positioning the lens body 12 on the substrate 170 so that the substrate's alignment feature 174 is viewable on the viewing surface 442 of the interposer's alignment structure 440, as best shown in FIG. 4. The method further includes moving the lens body 12 relative to the substrate 170 until the image 444 of the substrate's alignment feature 174 appears aligned, e.g., centered, relative to the viewing surface 442 and/or its peripheral boundary 448, as best shown in FIG. 5. For lens bodies including more than one alignment feature and more than one alignment structure, the interposer should be moved until all images 444 concurrently appear to be aligned relative to a respective viewing surface. The lens body 112 should then be secured relative to the substrate. This step may involve applying and curing a suitable epoxy, such as a UV-curable epoxy, as well known in the art.

Figure 3:
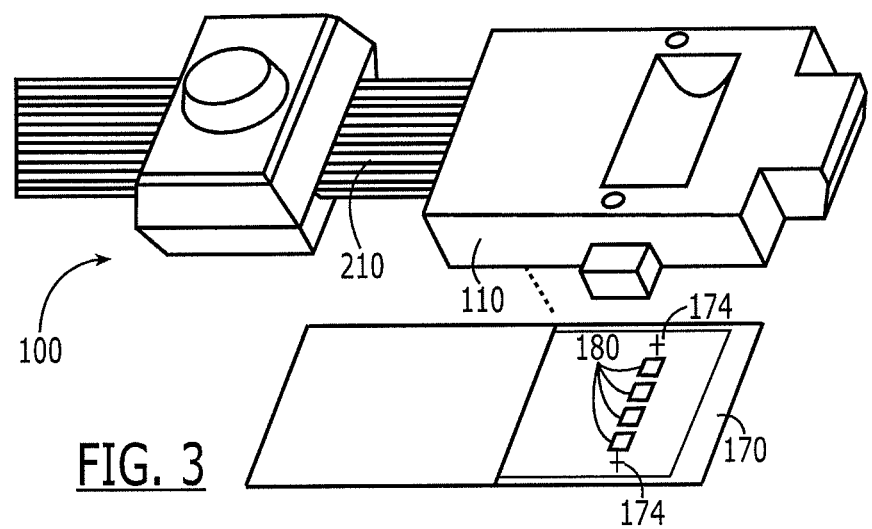
FIG. 3 is a perspective view of the interposer of FIGS. 2a-2g, shown in an exploded view relative to an exemplary ferrule and substrate.
Figure 7:
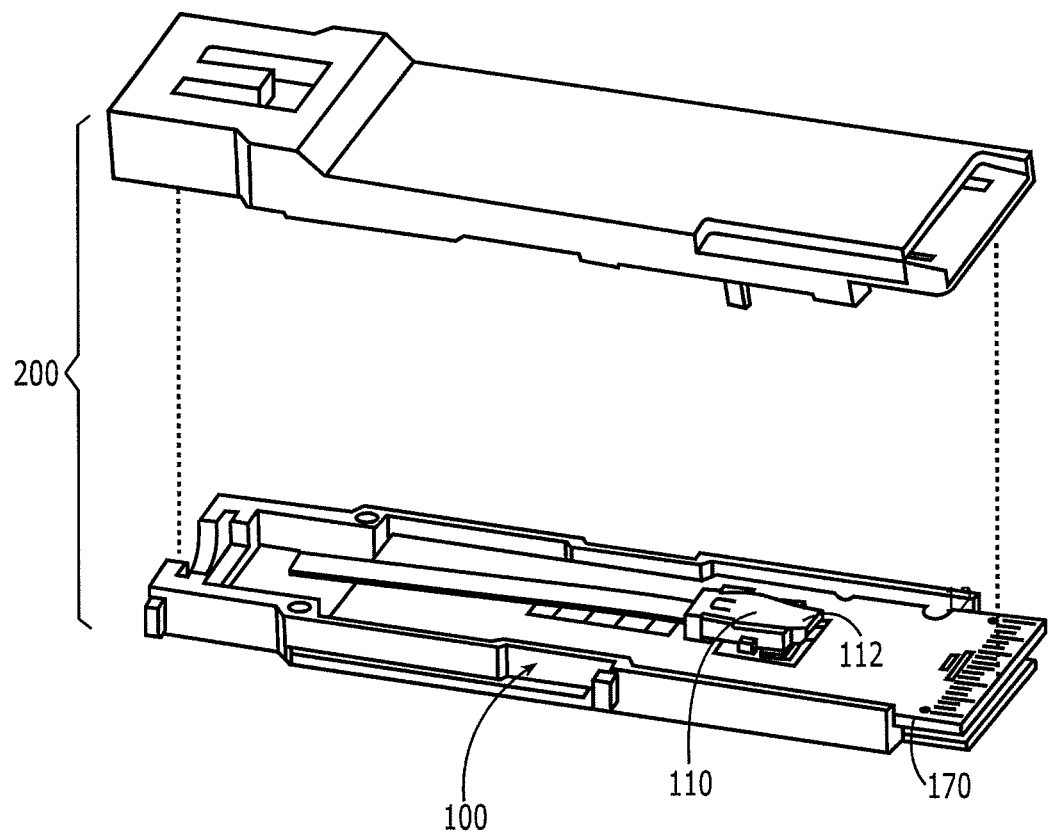
FIG. 7 is a perspective view of the interposer of FIGS. 2a-2g, shown partially assembled as part of an exemplary QSFP active cable lens assembly.

Accordingly, an optical subassembly 100 is provided that includes a substrate 170 having at least one perceptible alignment feature 174 and an interposer 110 secured to the substrate, such that the interposer 110 and substrate 170 are secured in relative positions in which each alignment feature 174 of the substrate 170 appears to be centered, or otherwise aligned, within a respective viewing surface 442 of the interposer's alignment feature 440, as best shown in FIGS. 5 and 6. Further, the optical subassembly 100 may include a ferrule, such as a multi-fiber ferrule 110 or other connector interface, supporting at least one optical fiber 210, as best shown in FIGS. 3 and 6. FIG. 7 shows an optical subassembly 100 shown mounted to a conventional housing as part of an exemplary QSFP active cable assembly 200. It will be understood that the optical subassembly 100 may be assembled into any suitable cable assembly, such as a CXP active cable assembly, and into any corresponding transceiver module, using conventional assembly techniques that are beyond the scope of the present invention, and thus are not discussed in detail herein.

It should be understood that interposer 110 and the optical paths defined therein are merely representative of the invention, and not exhaustive.

The dedicated lens/alignment feature/alignment structure arrangement described above is described with reference to an interposer, for illustrative purposes. However, it will be appreciated that this arrangement is applicable in a broad range of applications for the purpose of alignment of juxtaposed structures. For example, the arrangement may be employed in any application in which two objects are to be aligned relative to one another. Further, the arrangement described can be used other than in optical applications. For example, a similar arrangement may be used to align surface mount components prior to solder reflow in printed circuit boards.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. An optical interposer for optically coupling light between an OED supported on a substrate and an optical fiber, the interposer comprising:
    an interposer of an optically-clear moldable material comprising at least the following features:
        a port for receiving a ferrule containing at least one optical fiber, said port comprising an interface surface positioned to optically couple with an end face of said optical fiber;
        an active lens adapted to optically couple with an OED, said active lens and said interface surface optically coupled along an optical path in said interposer;
        a protrusion extending backward from said port, said protrusion defining a first register surface, said first register surface being a certain distance from said optical path such that, when a second register surface of a ferrule containing said optical fiber contacts said first register surface, a front portion of said ferrule is aligned to be received in said port.

2. The interposer of claim 1, wherein said first register surface is horizontal.

3. The interposer of claim 2, wherein said protrusion defines a third register surface, perpendicular to said first register surface, wherein said third register surface cooperates with a fourth register surface of said ferrule to align said ferrule horizontally relative to said interposer.

4. The interposer of claim 3, wherein said first register surface is downward facing.

5. The interposer of claim 3, wherein said protrusion comprises a third register surface on each of its sides.

6. The interposer of claim 5, wherein said sides are tapered such that said protrusion narrows from front to back.

7. The interposer of claim 1, further comprising said ferrule, said ferrule having said second register surface for contacting said first register surface.

8. The interposer of claim 7, wherein said first register surface is downward facing and said second register surface is upward facing.

9. The interposer of claim 7, wherein said protrusion has at least a third register surface perpendicular to said first register surface, and wherein said ferrule comprises a fourth register surface perpendicular to said second register surface, wherein said third register surface cooperates with said fourth register surface of said ferrule to align said ferrule in said port.

10. The interposer of claim 9, wherein said protrusion defines two third register surfaces, said third register surfaces being tapered such that said protrusion narrows from front to back.

11. The interpose of claim 9, wherein said front portion of said ferrule comprises four sides, two adjacent sides of said four sides being fifth and sixth register surfaces, and the remaining two sides having crush ribs, said fifth and sixth register surfaces cooperating respectively with seventh and eighth register surfaces around the perimeter of said port, said crush ribs urging said fifth and sixth register surfaces against said seventh and eighth register surfaces respectively such that said ferrule is precisely aligned in said port.

12. The interposer of claim 1, further comprising a clip, said clip urging said ferrule upward and forward such that said first and second register surfaces are urged together and said fiber end face is urged against said interface surface.

13. The interposer of claim 12, wherein said clip comprises at least one resilient forward tab, at least one a resilient top tab, and at least a rear tab, and wherein a front portion of said interposer comprises a recess for receiving said forward tab, said top tab urges against a top portion of said body, and said rear tab receive a rear portion of said ferrule such that said ferrule is urged forward and upward into said lens body.

14. The interposer of claim 13, wherein said ferrule comprises two rear lower corners and said rear tab comprises two rear corner tabs configured to receive said rear lower corners.

15. The interposer of claim 1, wherein said body further comprises
a reflective surface disposed along said optical path to bend light between said active lens and said interface surface.

16. The interposer of claim 15, wherein said reflector surface bends light about 90 degrees.

17. The interposer of claim 16, wherein said reflective surface is an air interface formed by a cavity in the top of said body, said cavity is defined by said reflective surface, a forward wall at about 55 to about 110° relative to said reflective surface, a rear wall at about 135 to about 180° relative to said reflective surface, and side walls at about 90 to about 120° relative to said reflective surface.

18. The interposer of claim 1, wherein said port is a rectilinear cavity defined in said optically-clear moldable material by at least four sides and a front wall, said front wall being said an interface surface.

19. The interposer of claim 18, wherein one of said sides is a top side and wherein said first register surface is coplanar with said top side.

20. An interposer for optically coupling light between an OED supported on a substrate and an optical fiber, the interposer comprising:
   a lens body of an optically-clear moldable material comprising at least the following features:
      a port for receiving a ferrule containing at least one optical fiber, said port comprising an interface surface positioned to optically couple with an end face of said optical fiber;
      an active lens adapted to optically couple with an OED, said active lens and said interface surface optically coupled along an optical path in said interposer;
      a reflective surface disposed along said optical path to bend light between said active lens and said interface surface, said reflective surface being an air interface formed by a cavity in the top of said body, said cavity is defined by said reflective surface, a forward wall at about 55 to about 110° relative to said reflective surface, a rear wall at about 135 to about 180° relative to said reflective surface, and side walls at about 90 to about 120° relative to said reflective surface.

21. The interposer of claim 20, wherein said reflector surface is about 45° to said substrate.

22. The interposer of claim 20, wherein said forward wall is about 90° to said reflective surface and said rear wall at about 145° to said reflective surface.

* * * * *